United States Patent [19]
Gerzanich

[11] 3,884,019
[45] May 20, 1975

[54] FLOATATIONAL FRONT MOUNTED MOWER ASSEMBLY FOR POWER VEHICLES

[75] Inventor: Michael Gerzanich, Hopelawn, N.J.
[73] Assignee: Lehara Equipment Co., Inc., East Brunswick, N.J.
[22] Filed: Jan. 9, 1974
[21] Appl. No.: 431,673

[52] U.S. Cl. .................. 56/12.7; 56/15.8; 56/16.2; 56/504
[51] Int. Cl............................................. A01d 49/00
[58] Field of Search .......................... 56/15.7–15.9, 56/16.2, 7, 503–505, 10.2, 12.7

[56] References Cited
UNITED STATES PATENTS

| | | |
|---|---|---|
| 2,704,921 | 3/1955 | Cunningham, Jr. ...................... 56/7 |
| 2,830,421 | 4/1958 | Blue et al. ................................. 56/7 |
| 3,183,650 | 5/1965 | Ferris ..................................... 56/15.9 |
| 3,564,822 | 2/1971 | Engler ............................... 56/15.9 X |
| 3,665,686 | 5/1972 | Duncan ............................. 56/15.9 X |

Primary Examiner—Louis G. Mancene
Assistant Examiner—J. N. Eskovitz
Attorney, Agent, or Firm—Arthur L. Plevy

[57] ABSTRACT

There is disclosed a floatational mower apparatus of the type employing a cylindrical cutting member, moveably mounted on a relatively small vehicle employing crawling tracks in lieu of wheels. The mower vehicle apparatus employs a unique suspension system which includes an hydraulic cylinder and a metal spring to enable the mowing cylinder to follow ground contours and be driven up or down steep inclines without "ploughing" the surface to be cut.

15 Claims, 10 Drawing Figures

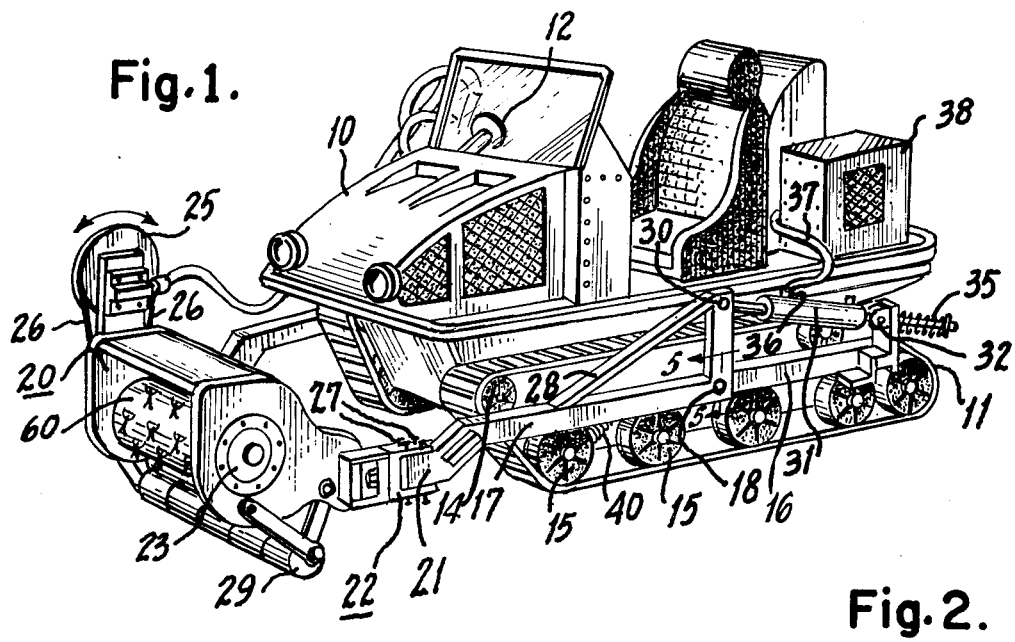
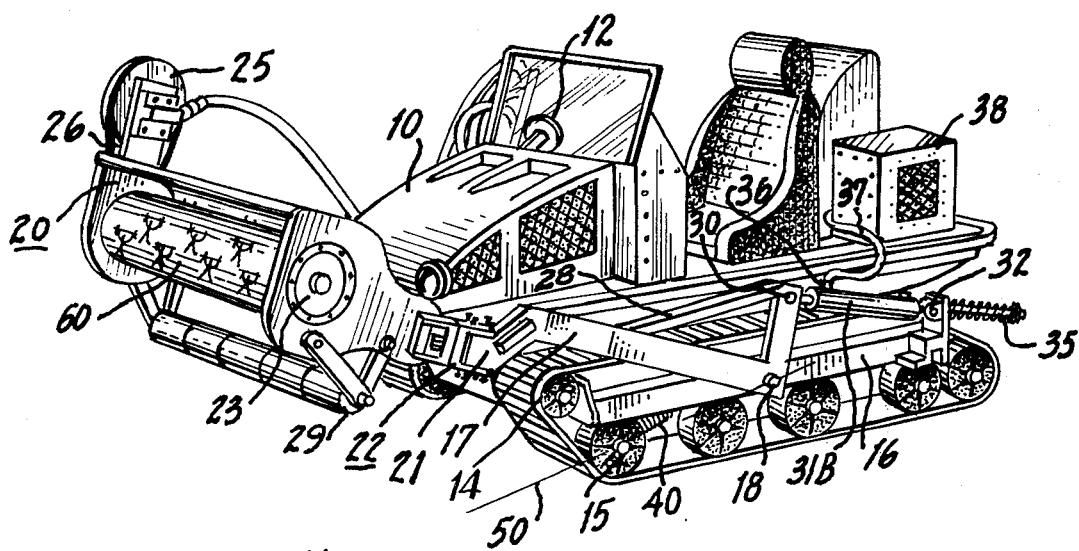
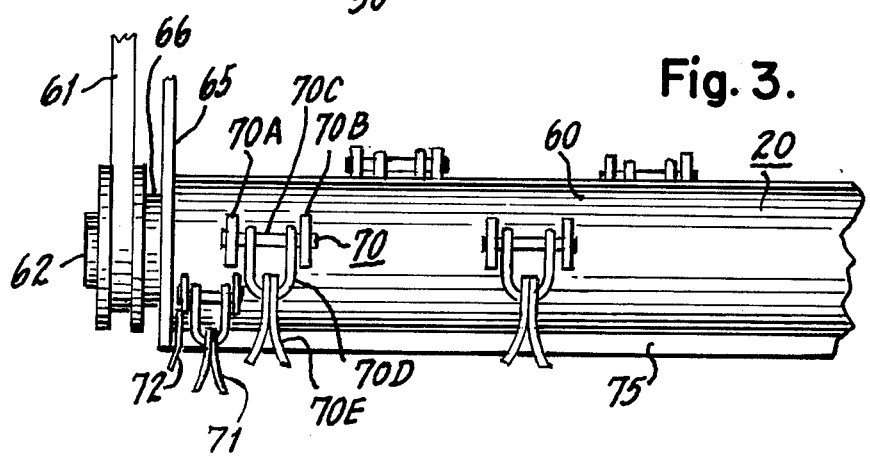

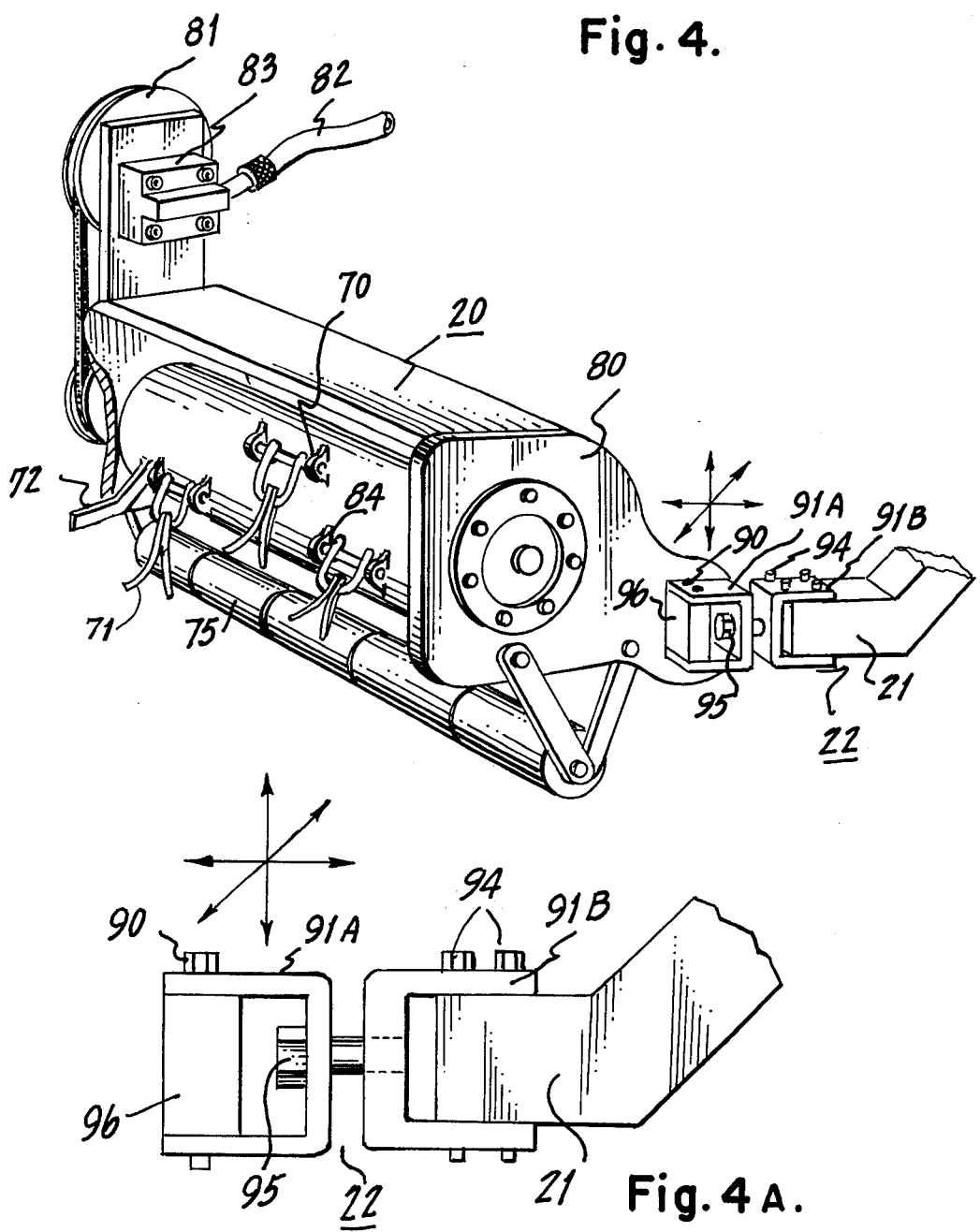

FLOATATIONAL FRONT MOUNTED MOWER ASSEMBLY FOR POWER VEHICLES

BACKGROUND OF INVENTION

This invention relates to mowers of the type which precede the vehicle upon which the mower is mounted, and more particularly to a floatational mower assembly adapted to be mounted on relatively small vehicles of the type employing crawling tracks in lieu of wheels.

Presumably there exists a need for a vehicle employing a grass cutter or mower assembly which can cut vegetation on relatively steep inclines without ruining the landscape and while completely capable of following the contour of terrain. A further need requires the use of a small mower vehicle to enable the operator or user to gain access to small areas as those which exist adjacent highways and especially on inclines near highway overpasses.

One can readily visualize the need for such a vehicle as many as these grassy areas visable about turnpikes, freeways, and so on are unkempt. The most reliable way of cutting such growth is by hand, this is an extremely difficult and time-consuming task as the operator of a self propelled hand mower or a manual mower has extreme difficulty in guiding and controlling the same on such inclines.

The prior art shows a number of patents including various mower arrangements adapted to move according to the contours of the terrain to permit the same to provide an accurate cut even though one is mowing an undulating surface.

For example of such patents reference is made of U.S. Pat. No. 2,991,612 entitled FRONT MOUNTED MOWER FOR RIDING TRACTORS issued on July 11, 1961 to F. C. Holmes.

This device employs rotary cutting heads which are mounted to float to thus follow the ground contour and permit uniform grass cutting. Other patents as U.S. Pat. No. 3,066,465 entitled FRONT MOUNTED END TO END DOUBLE MOWER by R. C. Fischer issued on Dec. 14, 1962 use reciprocating blades which are pivotally mounted and move so that the same are held relatively perpendicular to the surface to be cut.

There are other examples of mowing apparatus which attempt to solve the problem of an undulating terrain by providing front mower apparatus which apparatus can undergo limited motion according to ground or surface contour. Some other interesting references are U.S. Pat. No. 1,022,292 entitled MOWING MACHINE by W. P. Anthony, Apr. 2, 1912; 1,830,871 entitled POWER BRUSH CUTTER by S. Domagala issued Nov. 10, 1931; 1,947,117 entitled POWER DRIVEN LAWN MOWER by H. J. Stegman issued on Feb. 13, 1934; 2,504,259 entitled MOWER by F. M. Ford issued on Apr. 18, 1950; 2,688,833 entitled TRACTOR ATTACHED MOWER OF THE ROTARY CUTTER TYPE by H. F. Weiss issued on Sept. 14, 1971 and others, as well.

Basically the bulk of the prior art devices are extremely complicated, are difficult to build and cannot and do not solve the above noted problem, namely the ability to cut vegetation on an inclined surface.

The problem being that a great deal of weight is embodied in the mower arrangement and as a vehicle is propelled up a relatively steep incline, there is a tendency for the mower to "plough." Ploughing results in the mower digging up the earth as well as the vegetation instead of cutting. The action is a simple physical result as the steeper the incline, and the more weight of the front mounted mower, the greater the tendency of the floating head to burrow into the incline instead of to continue cutting. Certain other prior art vehicles are extremely large and bulky and cut grass on an inclined surface by moving across the inclined surface instead of up the incline. These vehicles cannot gain access to areas beneath overpasses and so on as indicated above.

It is therefore an object of the present invention to provide a front-mounted, floatational cutting apparatus adapted to be mounted on a relatively light weight operator driven vehicle and capable of being powered by said vehicle to uniformly cut vegetation on inclines and similar surfaces previously inaccessible by those devices depicted in the prior art.

BRIEF DESCRIPTION OF PREFERRED EMBODIMENT

A propelled mower apparatus employs a power vehicle of the all terrain type employing crawling tracks, the vehicle includes a frame having a front end and a back end, mower head support brackets are pivotally mounted to said frame and as mounted, are adapted to pivot both horizontally in a side direction and vertically, said brackets extend beyond said front end of said frame, and a cylindrical mowing assembly secured at each front end of said brackets and adapted to cut vegetation on an undulating terrain due to the pivoting of said support brackets with respect to said frame.

BRIEF DESCRIPTION OF FIGURES

FIG. 1 is a side perspective view of a mower apparatus according to this invention.

FIG. 2 is a partial side view showing the mower assembly operated in a raised position.

FIG. 3 is a partial front view showing a cylindrical cutting assembly including a plurality of cutting knives according to this invention.

FIG. 4 is a perspective view of a cylindrical cutting or mowing assembly.

FIG. 4A is a detailed view of the coupling bracket.

DETAILED DESCRIPTION OF DRAWINGS

Figures 5, 6A, 6B, 7, 8:
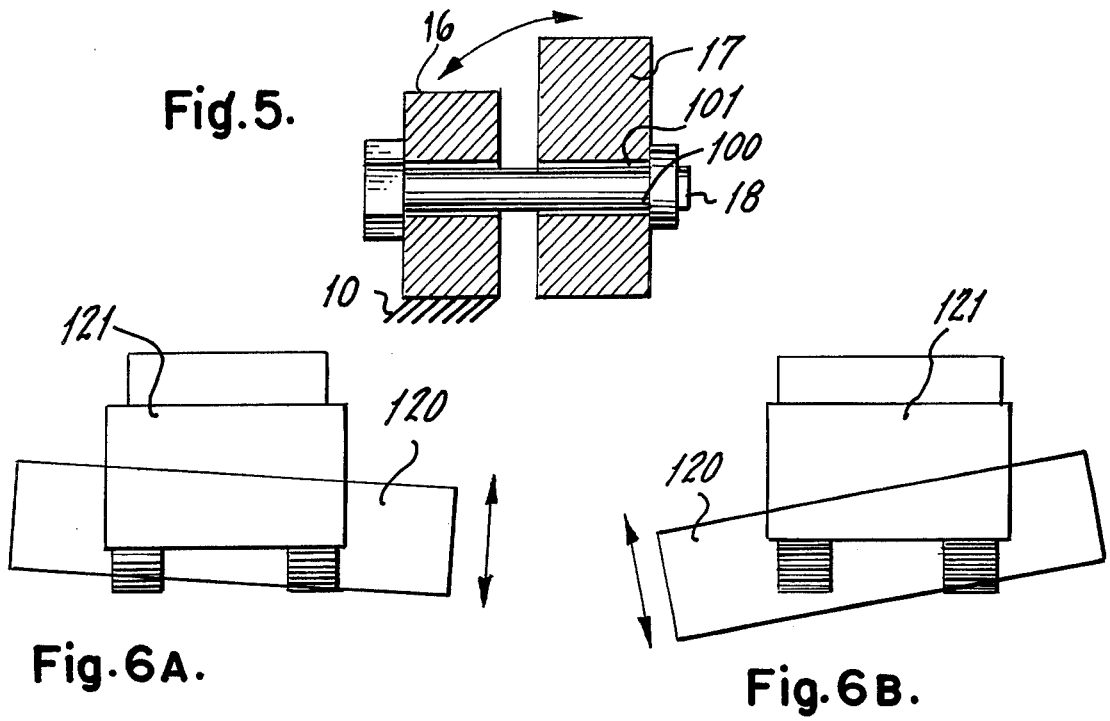
FIG. 5 is a cross sectional view showing a typical mounting arrangement for the support brackets used in the floatational suspension system according to this invention.
FIGS. 6A and 6B are diagrammatic front views useful in showing the floatational aspects of the system.
FIG. 7 is a partial diagram of the suspension system according to this invention.
FIG. 8 is a side elevational view of a mower vehicle operating on a steep incline.

Referring to FIG. 1, there is shown an all terrain vehicle or ATV 10. The vehicle 10 is of the type employing crawling tracks in lieu of wheels to enable the vehicle to negotiate and travel upon surfaces which are not readily accessible to conventional vehicles.

The ATV 10 is an easily maneuverable vehicle as it employs a low center of gravity and two wide stance rubber tracks 11. The tracks as 11 are relatively wide and serve to distribute the vehicle's weight relatively uniform so that excellent traction is maintained with a minimum effect on the surface of the terrain.

The vehicle 10 conventionally employs the two tracks which are separately driven by two hydrostatic transmissions. Thus one can employ different forces on the two track systems via their own transmission to allow rapid and short radius turns as well as a spin of the vehicle 10 about its own center. This is accomplished when one track is in reverse and the other is in forward.

The vehicle 10 is operated by a single T-handle to enable the operator to control the vehicle with one hand.

The track 11 rides on a series of bogie wheels 15 which are idling wheels and serve to maintain the track contour; an engine drives sprockets as 14 to propel the vehicle and hence afford forward motion of the same.

Such vehicles 10 are extremely rugged and reliable and are relatively small. An example of a suitable vehicle with proper operating characteristics which can be employed for vehicle 10 is manufactured by CUSHMAN MOTORS of 900 N. 21st St., Lincoln, Neb. and is marketed under the trademark of TRACKSTER.

This vehicle weighs 1,040 pounds, is 92 inches in length, 62 inches wide and 41 inches high with a track width of 15½ inches. The vehicle operates with an air cooled engine and can climb inclines in excess of 45°.

Other vehicles which employ tracks can be utilized as well as one manufactured by BOMBARDIER, LTD. of Valcourt, Quebec, Canada.

In any event a vehicle as 10 is low-cost and offers extreme advantages to the user in regard to its ability to climb steep inclines and maneuver over the most extreme surface conditions.

Such vehicles would be a natural for use as a driving source for a mower to enable a user to cut grass over rough terrains. However, the only application thus far has been to pull a mower from behind as a tow truck. The mowers towed are self propelled and are pulled up inclines. There is, of course, tremendous disadvantages in mowing in this manner as the operator never "sees" the results until it is over, the mowers as towed are easily damaged as they are unable to negotiate steep undulations that present no problem for the vehicle. This is in addition to the fact that the cutting is never uniform as the vehicle is also operating before the mowers and hence pre-flattens grass and vegetation, thus causing many areas to be entirely missed by the cutting blades of the mower.

Consequently, there are great advantages in providing a mower assembly which precedes the vehicle instead of being towed by the vehicle.

Referring to FIG. 1, there is shown a side bracket 16 which is secured to the frame of the vehicle 10 and is relatively rigid with respect thereto. It is also noted that there is a corresponding bracket on the opposite side, as the other side of the vehicle is relatively identical to the view shown in FIG. 1. The bracket or rail suspension 16 is a steel member suitably shaped and adapted for the purpose of adding additional equipment thereto as well as for protecting the side of the vehicle from injury due to impact.

Shown moveably secured to the rail 16 is an L-shaped assembly 17. The assembly 17 is also fabricated from a heavy material as steel and is secured to the bracket or rail 16 by means of a bearing joint 18. The bearing 18 operates as a knuckle joint and allows the L-shaped member to be raised and lowered or to move in the vertical plane with respect to the bracket 16 and to pivotally move in the horizontal plane or to tilt to the left or right with respect to the frame of the vehicle 10 or with respect to the side rail section 16. The bracket 17 has a support section 28 extending from the top of the bracket to the side thereof for increased strength and support. The member 28 may be welded to the L-shaped bracket or otherwise integrally formed therewith. The L-shaped bracket 17 supports a cylindrical mowing head assembly 20. An end member 21 is secured to bracket 17 or may be made part thereof. The mower assembly 20 is coupled to the member 21 by means of a maneuverable pivot joint 22. The joint 22 allows the mower assembly 21 to pivot with respect to the member 17 to allow greater flexibility and additional maneuverability of the mowing head 20 during operation. The bolts 27 also permit one to easily remove the mowing assembly, if desired.

The mower assembly 20 is a cylindrical mower which is rotatably mounted inside the mower hood, by means of bearing joints as 23.

The cylindrical mower is operated by means of a drive pulley 25, which may be driven directly from the engine of the ATV 10 or from a separate power source. The pulley 25 drives a belt 26, which belt is coupled to a suitable pulley secured to the mowing cylinder to allow rotation of the same in either direction at a speed determined by the relative sizes of the pulleys.

The L-shaped bracket 17 also includes a knuckle joint or pivot point 30 on the top of the L-member.

The pivot 30 has secured thereto one end of a hydraulic cylinder and piston assembly 31.

The piston portion of unit 31 is coupled to the joint 30 while the cylinder portion is coupled to a back pivot point 32 by means of a knuckle joint. The back pivot point 32 is rigidly secured and affixed to the side rail assembly 16. Also coupled at the pivot point 32 is a steel spring assembly 35. The operation of the hydraulic cylinder 31 and the steel spring assembly 35 enables the mower head to follow rapid ground undulations while constantly maintaining an accurate cut of vegetation.

Shown coupled to an input port 36 of the cylinder 31 is a tube 37.

The tube 37 feeds into an air compressor, if the cylinder is air operated or an hydraulic source, if fluid operated, 38.

Souce 38 functions to operate the piston portion of member 31 in a conventional and well known manner and to maintain the piston in any one of a plurality of desired positions.

Also shown engaging the front bogie wheel 15 is a shock absorber 40. The shock 40 serves to maintain an increased pressure on the bogie wheel 15 to avoid the "throwing" of a track during mower operation.

Basically the shock is a spring like assembly having one end secured to the frame of vehicle 10 and the other end riding in the ridge of the bogie wheel 15 to exert pressure thereon depending upon ground pressure exerted on the track 11.

Referring to FIG. 2, there is shown a partial view depicting the essential apparatus of FIG. 1 in a raised position. Exact numerals have been retained for simplicity of explanation.

In order to raise the entire mowing assembly to the maximum position as shown, the operator activates the power source 38 by means of a front panel control. This causes fluid, air or electricity in the case of a solenoid operated cylinder 35 to "pull" or move the piston 31A into the cylinder housing 31B.

Since the bearing joint 18 allows the L-bracket 17 to rotate the piston pulls the same up and in the position shown.

Accordingly the power source 38 can move the piston 31A out of the cylinder housing 31B to cause the mower 20 to contact the terrain or move below the bracket 16 to the position indicated by line 50.

Referring to FIG. 3, there is shown a front partial view of a cutting cylinder 60 employed as the main cutting mechanism in the mower assembly 20. The cylinder 60 is rotated rapidly by means of the belt drive 61 coupled to a drive shaft pulley 62. The cylinder is rotatably mounted on the hood 65 of the mower assembly 20; by bearing assembly or rotatable joint 66.

The surface of the cutting cylinder has included thereon a plurality of cutting knive assemblies as 70.

Each assembly includes two end flanges as 70A and 70B having a center rod 70C secured therethrough. Rotatably secured about the center rod 70C is a knife accommodating U-shaped member 70D; which supports the cutting blade assembly 70E. The surface of the cylinder 60 includes a great number of such assemblies as 70. It is also noted that the cutting assembly 71 closest to the hood portion 65 or the bearing 66, contains an additional member 72. Member 72 is secured to the center rod of the assembly 70 (as rod 70C), and serves as a deflection shield to prevent grass and other vegetation from wrapping about or entwining on the bearing or shaft 66. If this were permitted, it would serve to "bind" the shaft and make the drive more difficult. Accordingly each assembly as 71, closest to the ends of the cutting cylinder 60 includes a similar cutting shield to prevent binding as above described.

Also shown beneath the cutting assembly is a ground roller 75. The member 75 is a cylinder fabricated from a pliable or elastomeric material and is rotatably supported on the mower hood. The assembly 75 can be further seen in FIG. 1 as 29. This assembly 75 is an idler roller and serves to assure proper spacing of the cutting cylinder 60 when lowered to a cutting position. It is noted that as the cylinder 60 is rotating, the cutting blades 70E swing out and cut vegetation thereby as the cylinder 60 revolves, they swing out and back in, due to the surface centrifugal force. The phenomenon is well known and the assembly as 60 has been reliably used to cut grass, underbush, shrubs and so on. The deflector blade or member 72 has not, based on information and belief, been included on such assemblies known to the prior art.

FIG. 4 shows a perspective view of the mower assembly 20 to gain clear insight to the structural relations.

The cylinder 84 has at least five sets of cutting blades 70 about the surface thereof, each set or line containing about eight or more cutting blades across. It is also again noted, the outer blades as 71 contain the deflection shield.

The hood 80 serves to protect the operator and others in the vicinity from debris which can be thrown during the cutting operation.

As indicated, the ground idler roller 75 is beneath the cylinder 84 and positions the same properly when cutting is accomplished due to the flailing knive assemblies upon cylinder 84 rotation.

Shown also is the coupling bracket 22 to enable the mower assembly 20 to undergo additional movement to enable close following of ground or terrain undulations and as indicated by the arrows above, the coupling bracket 22.

The bracket 21 which may be an extension of bracket or rail 17 (FIG. 1) is secured to a U-shaped section 91B by means of the bolts 94. The hood 80 is secured to a solid block 96 which is inserted within a second U-shaped flange 91A by means of a pivot pin 90. The two U-shaped brackets 91A and 91B are pivotally coupled together by means of a pin 95, to permit lateral movement of the hood with respect to the channel 21.

Referring to FIG. 5, there is shown a cross section view taken through line 5—5 of FIG. 1 to show the movement afforded by the L-shaped bracket 17 with respect to the side rail assembly 16 integrally secured to the ATV chassis 10.

The cross section of the side rail 16 indicates a solid core, but it is understood that a channel beam could be used as well. Shown secured by means of a central rod 100 is the L-bracket 17. A space is afforded between them. The rod 100 is rotatably mounted within a cylindrical bearing housing 101 to also permit movement as shown by the arrow. Since the rail 16 is directly secured to the frame 10 of the vehicle, the L-bracket 17 can rotate and tilt with respect thereto due to the joint assembly or the knuckling action afforded by the assembly. It is noted that there are a plethora of means for accomplishing the coupling of the L-bracket 17 to the chassis or rail bracket 16 and any one of a number of such schemes could be utilized as alternatives.

FIG. 6A and 6B shows simple schematics and how the mower assembly 120 can move with respect to the frame of the vehicle 121.

The mower assembly 120 floats with respect to the frame of the ATV 121. It can tilt due to the tilting of brackets 17 and move up and down to follow undulations due to the coupling of the mower head or assembly 120 to the bracket 17 as above indicated. While the tiltable aspect of the mower assembly has been described, a most important function of operation has been reserved for description in conjunction with FIG. 7.

Basically the operation afforded is extremely difficult to implement and results in structure heretofore not known. A typical mowing assembly including the cutting cylinder and hood may weigh in excess of 1,000 pounds or does, in fact weigh more than most ATV vehicles as 10. Thusm as one can readily see, the tendency of the mower head is to pull the vehicle 10 down in front. This would cause the cutting head to plough if it were not for the flotational mounting assembly depicted in FIG. 7.

The apparatus shown in FIG. 7, of course exists on the other side of the vehicle as the system depicted is relatively symmetrical as above described.

A rail assembly 170 is shown as is the assembly 16 of FIG. 1. The rail assembly 170 is secured or rigidly fastened to the ATV frame. The L-shaped bracket 171 (17 of FIG. 1) is both rotatably and tiltably or pivotally secured to the rail 170 by means of the bearing or knuckle joint 172. The cross bar 173, as indicated, is used for strength, reinforcement and support.

Rigidly secured to the rail assembly 17 is a pivot point 175 depicted as a flange assembly; and actually comprising two extending ear flanges adapted to accommodate upon a common rod 176 both the end of a steel compression spring 178 and the cylindrical housing of the powered cylinder assembly 180.

As indicated the mower assembly or bracket 171 is raised and powered by introducing or removing power or fluid into the cylinder 180, thus moving the piston 180A in and out of the cylinder housing 180B and in the direction of arrow 190.

Once the operator causes the idler roller incorporated in the cutting assembly (as roller 75 of FIG. 4) to contact the ground, he does nothing more than operate the drive mechanism to perform cutting, as the entire assembly depicted in FIG. 7 will move or float according to ground contours and maintain the cutting cylinder always in the proper position. The action afforded is as follows. The arrow 195 shows the type of motion or forces which can be impressed on bracket 171 due to rises or depressions in ground contour. While the arrows 196 and 197 (in and out of the paper), indicate the forces which can occur due to side slopes as shown in FIG. 6A and FIG. 6B.

The piston 180A is secured to the L-bracket 171 at the juncture of 177. The piston 180A, when maintained in the housing at a pre-desired operated position, can still move in all directions indicated by arrow 90. The hydraulic cylinder 180 is relatively slow acting as compared to the steel spring 178. Both the spring 178 and the cylinder are also coupled to the rear pivot point 175. Thus, forces exerted on the assembly are transmitted by the cylinder 180 to pivot point 175 or to the rear end of the bracket 170. The spring 178 absorbs quick or rapid undulations and dissipates the extraneous force at pivot point 175, thus maintaining the center of gravity of the entire assembly. Slower undulations are absorbed by both the hydraulic cylinder and the spring. The bracket 171 can also move as shown by arrows 195, 196 and 197, but is constrained for rapid movement by the hydraulic cylinder 180. Thus, the bracket 171 is constantly being pushed back in to any position afforded by the ground contour. Due to the dual back pivot point 175, such forces caused by ground undulations are directed to the back of the vehicle and hence the front weight or the weight of both the cutting head assembly and the ground forces are balanced. The spring 178 can also move about the pivot 175 as shown by arrow 198 and dashed line 199. This as is seen serves as a balance about pivot point 175 further compensating for extraneous forces caused by terrain undulations.

FIG. 8 shows a moving vehicle according to this invention negotiating an incline of about an angle and in excess of 40 degrees by forward cutting.

Essentially the above described mower apparatus was mounted on a Cushman TRACKSTER as described above and more particularly described in a publication entitled CUSHMAN TRACKSTER by Cushman Motors of Lincoln, Nebr., Form No. 72 – TR – 1 (eight pages). The vehicle was modified to include a replacement side rail having the necessary machinery to accommodate the back pivot 175 (FIG. 7) and the joint 172. A motor was added to drive the cylindrical cutting head; a hydraulic pump assembly was added as was the flotational mower assembly of FIG. 7. The shock absorber 40 was also added on the front to coact with the bogie wheel 15 to prevent the throwing of a track due to the increased mowing head and assembly weight. The weight of the vehicle is about 1,040 pounds while the weight of the added parts was in the vicinity of 1,300 pounds.

The completed mower vehicle was able to climb and mow grass in vertical inclines of 40° or more and on horizontal inclines in excess of 25°. Since the unit is about 5 feet wide, it was able to "mow" terrains efficiently and of extremely narrow dimensions. The cylindrical mower head and roller can operate over any type of depressions or holes and are not subjected to jamming due to the action afforded and because of the added deflector plates or blades.

The unit operates in areas completely inaccessible to any prior art mower as on inclined terrains, ditches and so on.

While the advantages of utilizing an ATV vehicle are apparent, it is understood that the unique floatational mower suspension system above described can be adapted to a plurality of different vehicles offering the advantages of uniform cutting with a front operating mower assembly.

While the invention has been particularly shown and described with reference to the above figures, it will be understood by those skilled in the art that the foregoing and other changes and modifications in form and detail may be made therein without departing from the spirit and scope of the invention.

I claim:

1. A propelled mower apparatus of the type employing a power vehicle including a frame, said vehicle having a front end and a back end, mower head support brackets pivotally mounted on said frame at each side thereof and pivotable both vertically and transversely, with respect to said frame at a pivot point substantially removed from said front end of said vehicle, force absorbing means coupling said brackets at said pivot point to said frame, said brackets extending beyond said front end of said frame, and a cylindrical mowing assembly rotatably secured at each front end of said brackets and adapted to cut vegetation in an undulating surface due to the pivoting of said support brackets with respect to said frame.

2. The mower apparatus according to claim 1 wherein said power vehicle is an all terrain vehicle of the type employing crawling tracks.

3. The mower apparatus according to claim 1 further including a hydraulic cylinder assembly coupled to said support brackets and adapted to raise or lower the same when a source of power activates said cylinder.

4. Apparatus for mowing vegetation on undulating terrains including a power driven vehicle of the type including a frame assembly having a front end and a back end, in combination therewith apparatus for providing a front, floatational mower assembly, comprising:

a. first and second rails rigidly secured to a first and second side of said frame, b. a first and second support bracket, each respectively pivotally secured to one said first and second rails, and pivotable with respect thereto in both a vertical and horizontal direction, said support brackets positioned on said rails at a point removed from either end of said rail, c. a pivot juncture means secured to said first and second rails at a point on said rail nearer said back end of said vehicle, d. force absorbing means coupling said first and second support brackets to said respective pivot juncture to cause extraneous forces to be absorbed about said juncture, and e. a vegetation cutting assembly mounted on said support brackets at said front end of said vehicle.

5. The appartus according to claim 4 wherein said power driven vehicle is an all terrain vehicle incorporating crawling tracks for propelling the same.

6. The apparatus according to claim 4 wherein said support brackets as pivotally secured to said rails includes a bearing coupling means operative to function as a knuckle joint.

7. The apparatus according to claim 4 wherein said force absorbing means includes a cylinder having a piston portion and a cylindrical housing portion, said piston portion coupled to said support bracket and said cylindrical housing portion coupled to said pivot juncture means, and b. a source of power coupled to said cylinder and operative to move said piston with respect to said housing portion to raise or lower said support bracket in a relatively vertical plane.

8. The apparatus according to claim 4 wherein said vegetation cutting assembly comprises a rotatable cylinder incorporating on a surface thereof, a plurality of moveable cutting knives adapted to cut upon rotation of said cylinder.

9. The apparatus according to claim 4 further including a steel spring coupled at one end to said juncture point and adapted to contract and expand thereabout to absorb rapid perturbations due to undulations of said terrain.

10. The apparatus according to claim 7 wherein said cylinder is hydraulic.

11. Apparatus for mowing vegetation on undulating terrains, including a power driven vehicle of the type including a frame assembly having a front end and a back end, the improvement therewith of apparatus for providing a front, floatational mower suspension assembly, comprising:

a. first and second L-shaped support brackets pivotally mounted on a respective side of said frame of said vehicle and pivotable vertically and transverse to said side; with the one arm of said "L" extending towards the front end of said frame and the other extending relatively upward therefrom, b. pivot juncture means secured to said frame nearer said back end thereof, c. force absorbing means coupling said upward extending arm of said L-shaped bracket to said pivot juncture to cause forces exerted on said support bracket to be directed towards said pivot juncture means and, d. a cylindrical cutting head rotatably mounted between said first and second support brackets and beyond said front end of said frame, said head including a plurality of cutting blades on a surface thereof.

12. The apparatus according to claim 11 wherein said cutting blades on said surface of said cylinder nearest said support bracket include a vegetation deflection shield to prevent cut vegetation from interferring with the rotation of said cylinder.

13. The apparatus according to claim 11 wherein said L-shaped support brackets as pivotally mounted include a bearing knuckle joint coupling said bracket to said frame.

14. The apparatus according to claim 11 wherein said force absorbing means includes a hydraulic cylinder.

15. The apparatus according to claim 11 further including a spring having one end coupled to said pivot juncture means and extending outwardly therefrom towards said back end of said frame to further absorb forces directed at said juncture means.

* * * * *